United States Patent
Nilson

(10) Patent No.: US 6,661,145 B1
(45) Date of Patent: Dec. 9, 2003

(54) ROTOR FOR A HIGH SPEED PERMANENT MAGNET MOTOR

(75) Inventor: Thord Agne Gustaf Nilson, Tyresö (SE)

(73) Assignee: InMotion Technologies Aktiebolag, Stockholm (SE)

(*) Notice: Subject to any disclaimer, the term of this patent is extended or adjusted under 35 U.S.C. 154(b) by 0 days.

(21) Appl. No.: 09/937,802

(22) PCT Filed: Mar. 27, 2000

(86) PCT No.: PCT/SE00/00591

§ 371 (c)(1),
(2), (4) Date: Feb. 11, 2002

(87) PCT Pub. No.: WO00/59097

PCT Pub. Date: Oct. 5, 2000

(30) Foreign Application Priority Data

Mar. 26, 1999 (SE) ................................................ 9901107

(51) Int. Cl.[7] .......................... H02K 1/27; H02K 1/28; H02K 1/22; H02K 21/12
(52) U.S. Cl. ...................... 310/156.22; 310/42; 310/45; 310/156.01; 310/156.08; 310/89; 310/91
(58) Field of Search ............................ 310/89, 91, 217, 310/156.22, 156.01, 156.08

(56) References Cited

U.S. PATENT DOCUMENTS

| | | | | |
|---|---|---|---|---|
| 2,877,366 A | * | 3/1959 | Carr ...................... | 310/156.51 |
| 3,482,156 A | * | 12/1969 | Porath ................... | 310/156.13 |
| 3,659,129 A | * | 4/1972 | Pettersen ................ | 310/211 |
| 4,053,801 A | * | 10/1977 | Ray et al. .............. | 310/154.08 |
| 4,127,786 A | * | 11/1978 | Volkrodt ................ | 310/156.84 |
| 4,406,958 A | * | 9/1983 | Palmero et al. ......... | 310/156.64 |
| 5,091,668 A | * | 2/1992 | Cuenot et al. .......... | 310/156.61 |
| 5,095,238 A | * | 3/1992 | Suzuki et al. .......... | 310/156.46 |
| 5,448,123 A | * | 9/1995 | Nilson et al. .......... | 310/156.22 |
| 5,864,196 A | | 1/1999 | Yun | |
| 6,259,180 B1 | * | 7/2001 | Pop, Sr. ................ | 29/598 |

FOREIGN PATENT DOCUMENTS

| | | | | |
|---|---|---|---|---|
| JP | 06318950 A | * | 1/1988 | |
| JP | 06245473 A | * | 9/1994 | ......... H02K/37/14 |
| JP | 10243586 A | * | 9/1998 | ............ H02K/1/27 |

OTHER PUBLICATIONS

Derwent's Abstract No. 97–433729/40, week 9740, Abstract of RU, 2074478 (Lototskii, V. L.), Feb. 27, 1997.

Derwent's Abstract No. 95–73784/10, week 9510, Abstract of SU, 1835112 (Magneton Res. Prodn. Assoc.), Aug. 15, 1993.

* cited by examiner

Primary Examiner—Nestor Ramirez
Assistant Examiner—J. Aguirrechea
(74) Attorney, Agent, or Firm—Frishauf, Holtz, Goodman & Chick, P.C.

(57) ABSTRACT

A rotor for a high speed permanent magnet motor comprises a central spindle (20), and a plurality of magnet discs (21) stacked on the spindle (20) and axially clamped by a clamping device (24–26, 28) on the spindle (20) to form an axially pre-tensioned disc packet core (16). Each magnet disc (21) has at least one electrically insulating layer, and a reinforcement disc (23) is provided between the magnet discs (21) and/or between at least one of the magnet discs (21) and the clamping device (24–26, 28). The reinforcement discs (23) are clamped such that a clamping force generated frictional engagement is obtained between the reinforcement discs (23) and the magnet discs (21) by which centrifugal forces are transferred from the magnet discs (21) to the reinforcement discs (23) during motor operation, thereby relieving the magnet discs (21) of tensile stress.

8 Claims, 2 Drawing Sheets

ROTOR FOR A HIGH SPEED PERMANENT MAGNET MOTOR

FIELD OF THE INVENTION

The invention relates to a rotor for a high speed permanent magnet motor. In particular, the invention concerns a motor rotor comprising a plurality of magnetic discs stacked on a central spindle, a clamping device provided to exert an axial clamping force on said magnetic discs to form an axially pre-tensioned disc packet, wherein each of said magnetic discs is provided with at least one electrically insulating layer for electrical separation relative to adjacent discs or to said clamping device.

BACKGROUND OF THE INVENTION

It is a fact that permanent magnetic materials used in motor rotors are exposed to a high centrifugal stress, and that the tension strength limit of such materials is easily reached at high speed operation. This means that permanent magnetic rotors have to be reinforced to cope with the high centrifugal stresses generated at high speed operation.

A previously known method to reinforce permanent magnet rotors is to provide an outer sleeve enclosing the permanent magnetic material parts of the rotor. Such sleeve may comprise a high-strength metal tube made of a non-magnetic material like titanium, cold worked stainless steel, etc. or may be formed of a high-strength fiber bandage wound around the permanent magnet parts of the rotor. In both cases the reinforcement is radially pre-tensioned to minimize the tension stress on the magnetic material caused by centrifugal forces during operation of the motor.

In small diameter rotor applications, an outer reinforcement sleeve is undesirable since it adds to the diameter of the rotor. It is undesirable also from the manufacturing cost point of view, because the sleeve not only adds one or more details to the rotor, it also adds a number of extra working operations when assembling the rotor.

SUMMARY OF THE INVENTION

In order to solve the above-mentioned problems, the present invention provides a permanent magnet rotor which does not have any outer sleeve. Instead, the permanent magnet rotor of the present invention comprises a reinforcement means which does not influence the diameter of the rotor and which does not complicate the assemblage of the rotor.

A preferred embodiment of the invention is below described in detail with reference to the accompanying drawings.

DETAILED DESCRIPTION

Figure 1:
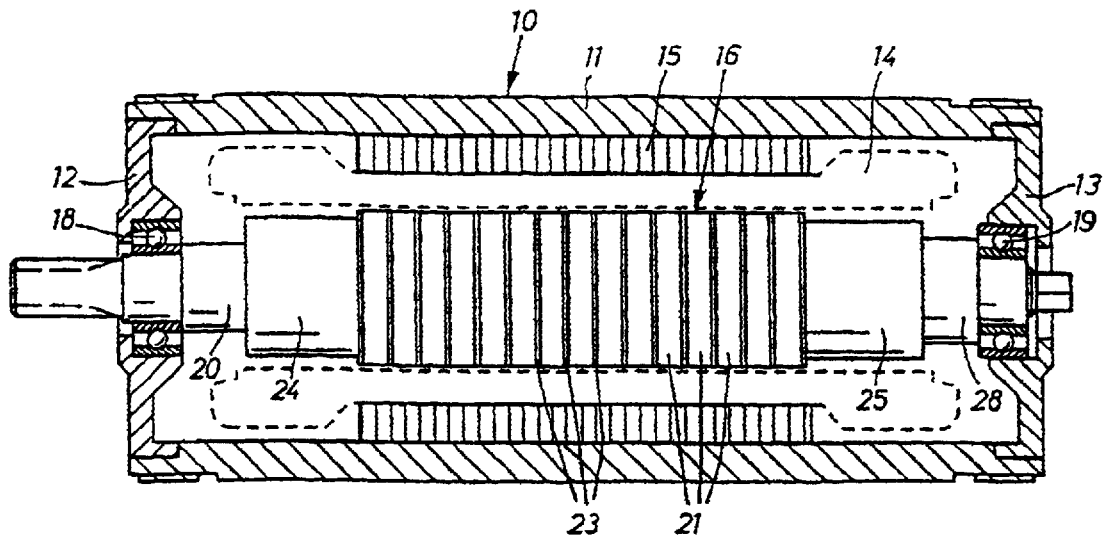
FIG. 1 shows, partly in section, a side view of a motor having a rotor according to the invention.
Figure 2:
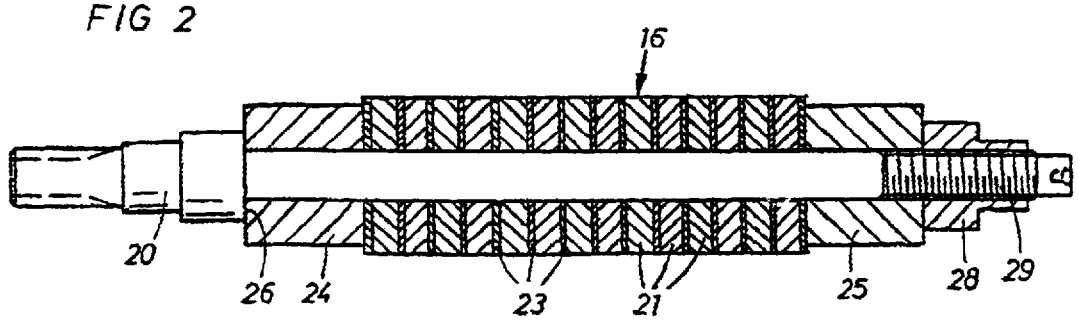
FIG. 2 shows a longitudinal section through a rotor according to the invention.
Figure 3:
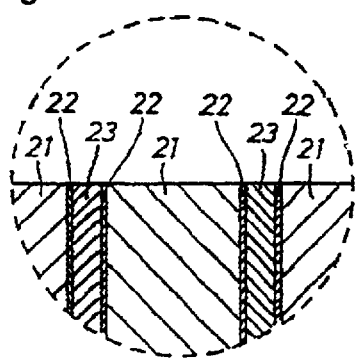
FIG. 3 shows, on a larger scale, a fractional view of the rotor in FIG. 2 illustrating schematically the magnet disc arrangement according to the invention.

The motor illustrated in FIGS. 1–4 comprises a stator 10 including a cylindrical casing 11, two end walls 12, 13, electrical windings 14 and a tubular core 15 surrounding the windings 14, and a rotor 16. The rotor 16 is journalled in two bearings 18, 19 supported in the stator end walls 12, 13 and comprises a central spindle 20, a plurality of permanent magnet discs 21 provided on each side with a layer 22 of electrically insulating material, and a number of reinforcement discs 23 located between the magnet discs 21. The purpose and functional features of the reinforcement discs 23 will be described in further detail below.

The insulating layers 22 provided on the magnet discs 21 consists suitably of an inorganic material, for instance an oxidized aluminium foil. This type of material has a very high coefficient of elasticity, which means that it has practically no tendency to creep under heavy centrifugal loads. Neither have these materials any tendencies to adopt different coefficients of elasticity at different temperatures. This is advantageous when operating a motor at a very high speed under shifting load conditions.

Since the magnet material used for this purpose is quite brittle and, accordingly, has a low tensile strength, the packet of discs 21 is axially pre-tensioned to assure that no tensile stress in the magnet discs 21 in the axial direction will occur during operation of the motor. This is accomplished by a clamping device comprising two sleeve elements 24,25 mounted on the spindle 20. One of these sleeve elements 24 is axially supported against a shoulder 26 on the spindle 20, whereas the other sleeve element 25 is backed by a nut 28 engaging a thread 29 on the spindle 20. At the assembly of the rotor 16, the nut 28 is tightened up to the yield stress level of the spindle material in order to obtain the highest possible pre-tension of the magnet disc packet and to assure that no local tension stresses due to bending loads on the rotor 16 will occur in the magnet disc packet.

A permanent magnet motor of the above type is previously described in U.S. Pat. No. 5,448,123.

In this type of motor, the magnet discs 21 are also exposed to heavy centrifugal forces during high speed operation, which means that the magnet material may be exposed to a detrimental tensile stress. This, however, is avoided by inserting on both side of each magnet disc 21 a reinforcement disc 23 which due to the axial clamping action accomplished by the clamping device 24–26,28 frictionally engages each side of the magnet discs 21. This frictional engagement results in a transfer of centrifugal forces from the magnet discs 21 to the reinforcement discs 23 resulting in a tensile stress relief in the magnet discs 21.

In order to fulfil this task, the reinforcement discs 23 are made of a high-strength material such as high-strength metal, ceramic, composite etc. which is very stiff to tensile forces. Accordingly, the coefficient of elasticity of these materials is very high.

As clearly shown in FIGS. 1–4, the reinforcement discs 23 have substantially a same outer dimension (diameter) as the magnet discs 21.

Figure 4:
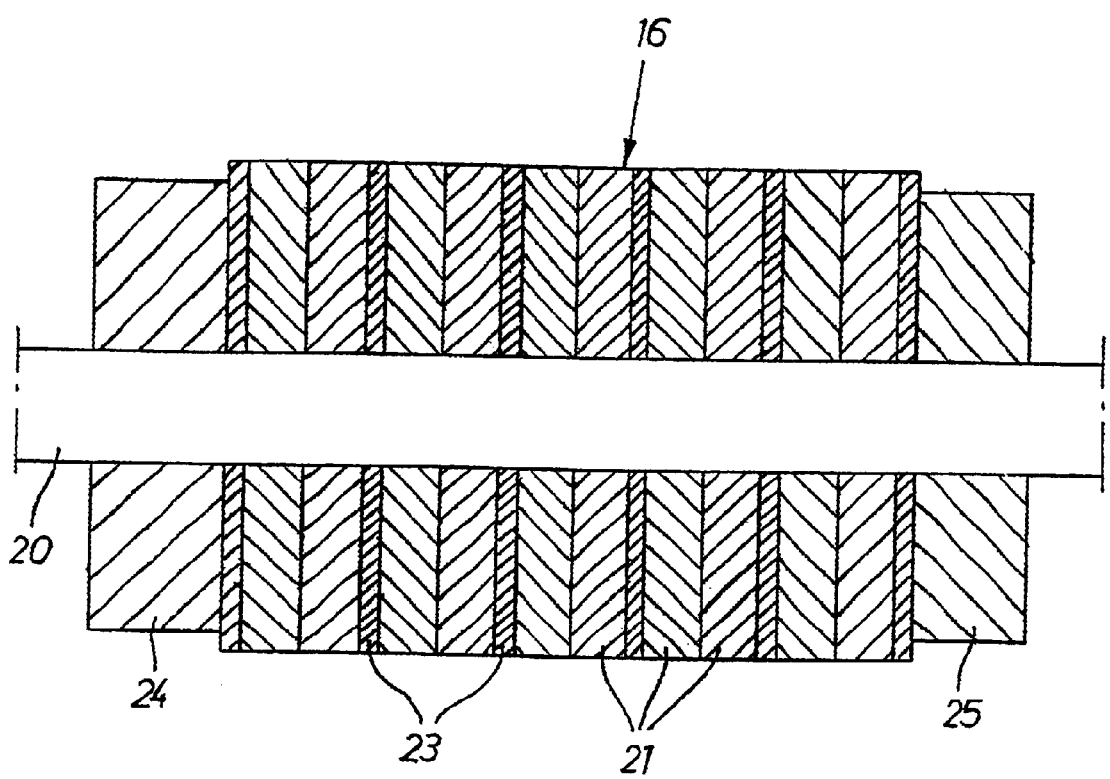
FIG. 4 shows a rotor according to the invention having a reinforcement disc between every second magnetic disc.

In some cases where the centrifugal forces are not too high and/or the magnet discs are thin, it might be enough to use a reinforcement disc 23 between every second magnetic disc 21 only (see FIG. 4).

If the magnet discs 21 are thin, it may also be enough to use an electrically insulating layer 22 between every second magnet disc 21 only.

As appears from the drawing figures, the magnetic discs 21 as well as the reinforcement discs 23 are of a flat shape and the centrifugal forces appearing in the magnetic discs 21 are transferred by pure friction to the reinforcement. Using pure flat discs is advantageous in that the discs are easily manufactured from sheet material. Machining the discs into other shapes would be very difficult since the high-strength material in the reinforcement discs 23 is very hard to work. It is conceivable, though, to use conical discs such that the frictional engagement between the magnetic discs 21 and the reinforcement discs 23 is amplified by a radial wedge action between the discs.

In order to accomplish a radial pre-tensioning of the magnetic discs 21 and ensure that absolutely no tensile forces would occur in the magnetic material, the reinforcement discs 23 are heated up before assembling and axially clamping the rotor disc packet. If, however, the thermal coefficient of expansion for the reinforcement discs is sufficiently higher than that of the magnetic discs, it is sufficient to heat the complete rotor assembly before axially clamping the disc packet. Heating of the complete rotor assembly would of course simplify the assembly process. When cooling off, the shrinkage of the reinforcement discs 23 accomplishes, via the frictional engagement, a radially inwardly directed pre-tension of the magnet discs 21.

What is claimed is:

1. A rotor for a high speed permanent magnet motor comprising:

a central spindle, a plurality of magnet discs stacked on said spindle, a clamping device provided on said spindle for exerting an axial clamping force on said magnet discs, thereby forming an axially pre-tensioned disc packet, and a reinforcement disc of a non-magnetic high-strength material provided at least one of (i) between at least every second magnetic disc, and (ii) between at least one of said magnetic discs and said clamping device, wherein the reinforcement discs have substantially a same outer dimension as the magnet discs, and wherein each reinforcement disc is clamped by said axial clamping force between said at least every second magnet disc or between said at least one magnet disc and said clamping device, thereby accomplishing a frictional engagement between said reinforcement discs and said magnet discs for transferring centrifugal forces from said magnet discs to said reinforcement discs, and thereby relieving said magnet discs of tensile stress.

2. A rotor according to claim 1, wherein one said reinforcement disc is located between every two adjacent magnet discs.

3. A rotor according to claim 1 or 2, wherein each one of said magnet discs comprises at least one electrically insulating layer.

4. A rotor according to claim 1, wherein said reinforcement discs are flat in shape.

5. A rotor according to claim 1, wherein said reinforcement discs comprise a high-strength metal.

6. A rotor according to claim 1, wherein said reinforcement discs comprise a ceramic material.

7. A rotor comprising:

a central spindle, a plurality of magnet discs stacked on said spindle, a clamping device provided on said spindle for exerting an axial clamping force on said magnet discs, thereby forming an axially pre-tensioned disc packet, and a reinforcement disc of a non-magnetic high-strength material provided at least one of (i) between at least every second magnetic disc, and (ii) between at least one of said magnetic discs and said clamping device, wherein each reinforcement disc is clamped by said axial clamping force between said at least every second magnet disc or between said at least one magnet disc and said clamping device, thereby accomplishing a frictional engagement between said reinforcement discs and said magnet discs for transferring centrifugal forces from said magnet discs to said reinforcement discs, and thereby relieving said magnet discs of tensile stress, wherein said magnet discs are radially pre-tensioned by a pre-assembly heat treatment of said reinforcement discs.

8. A rotor according to claim 7, wherein a thermal coefficient of expansion of the reinforcement discs is higher than a thermal coefficient of expansion of the magnet discs, and said heat treatment comprises heating the rotor assembly before applying said axial clamping force.

* * * * *